United States Patent Office 3,469,674
Patented Sept. 30, 1969

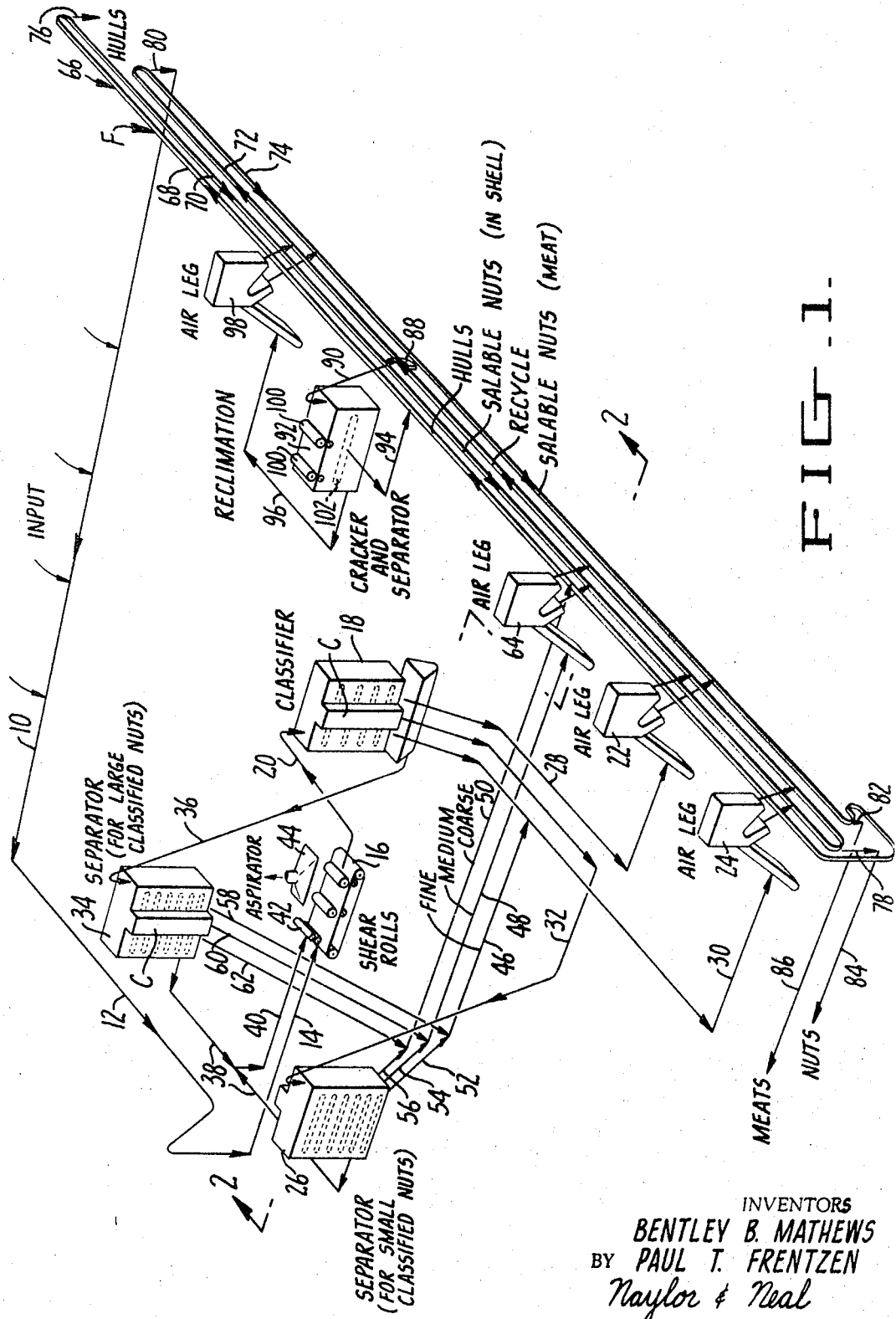

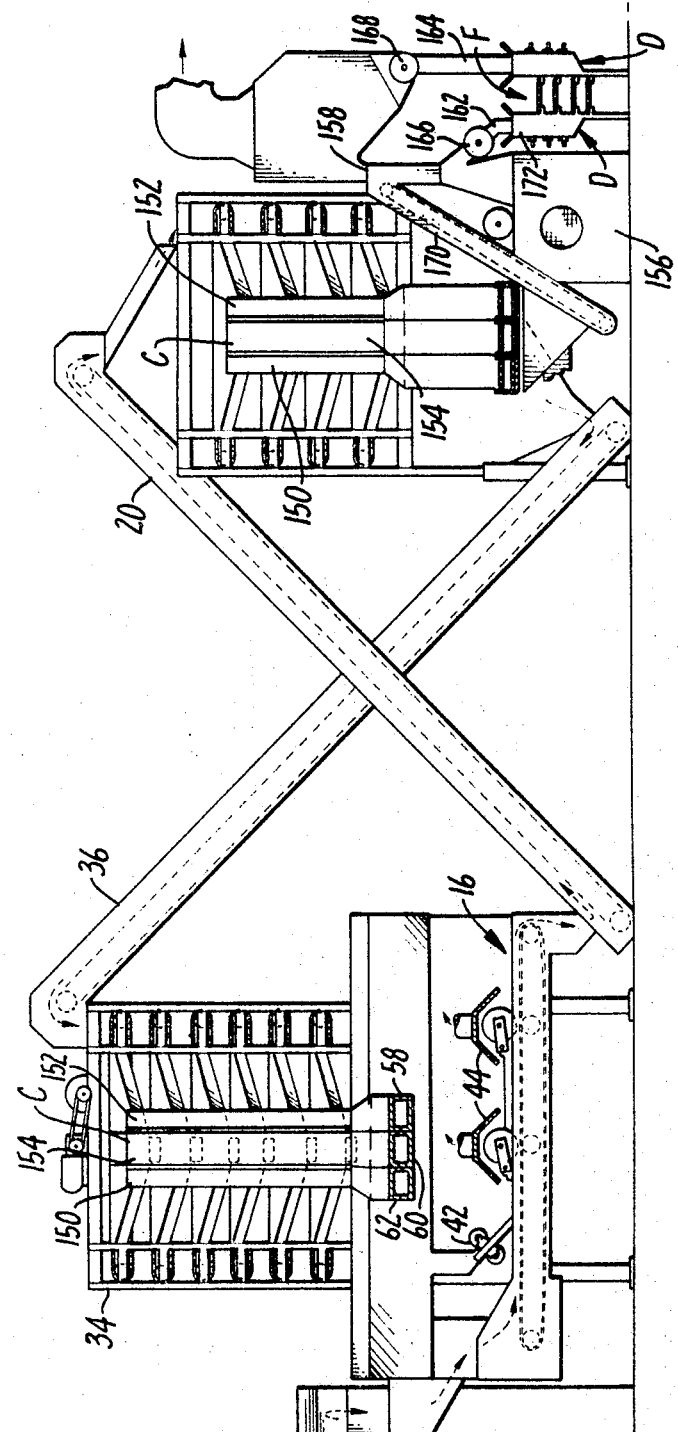

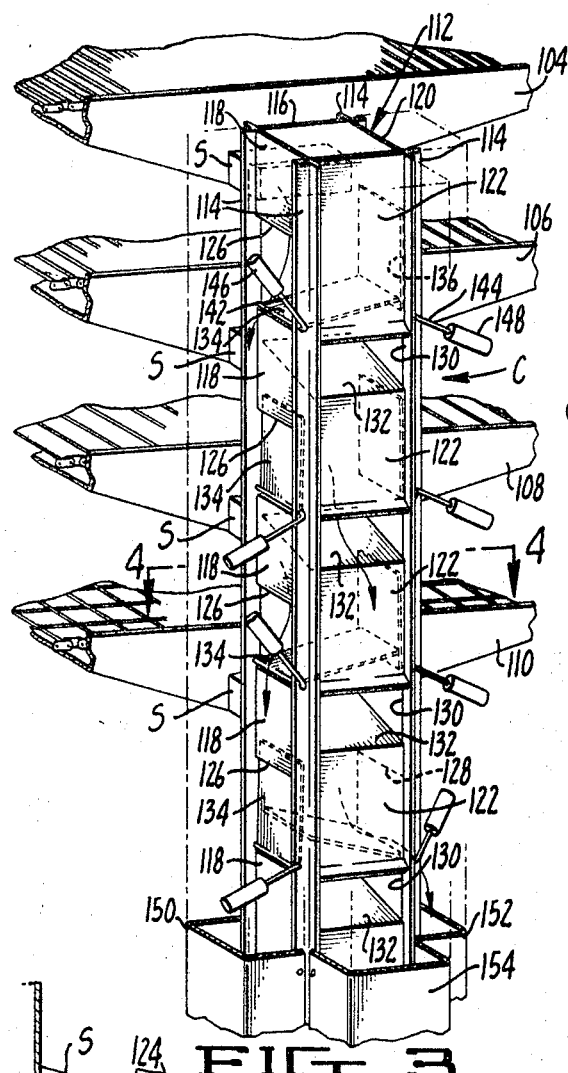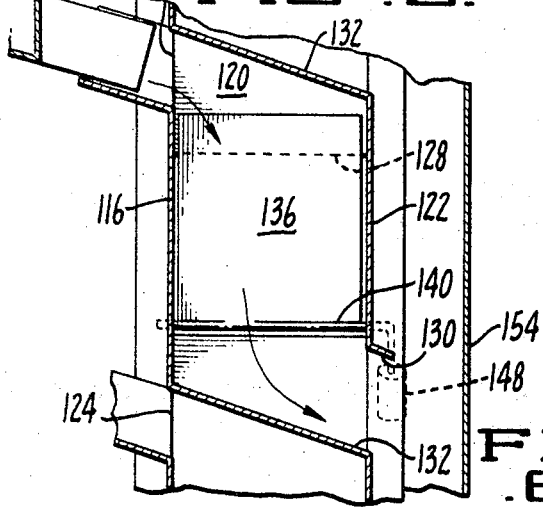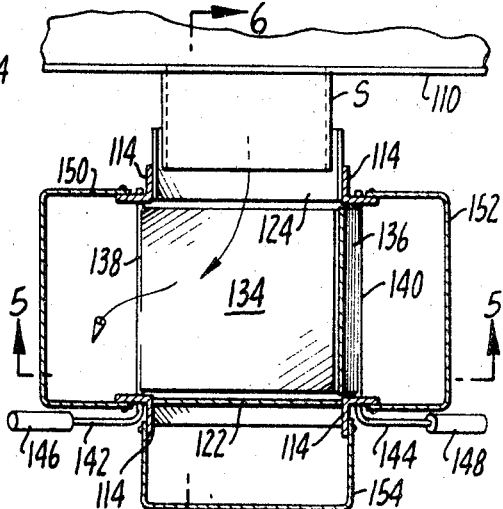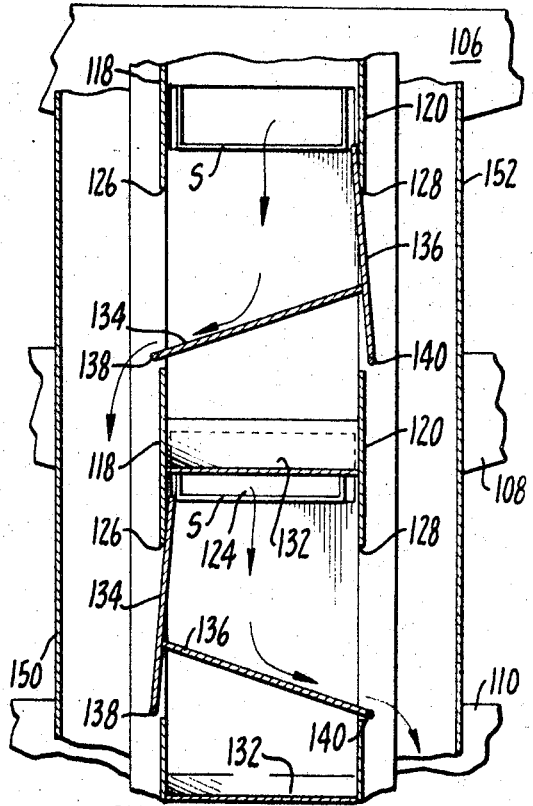

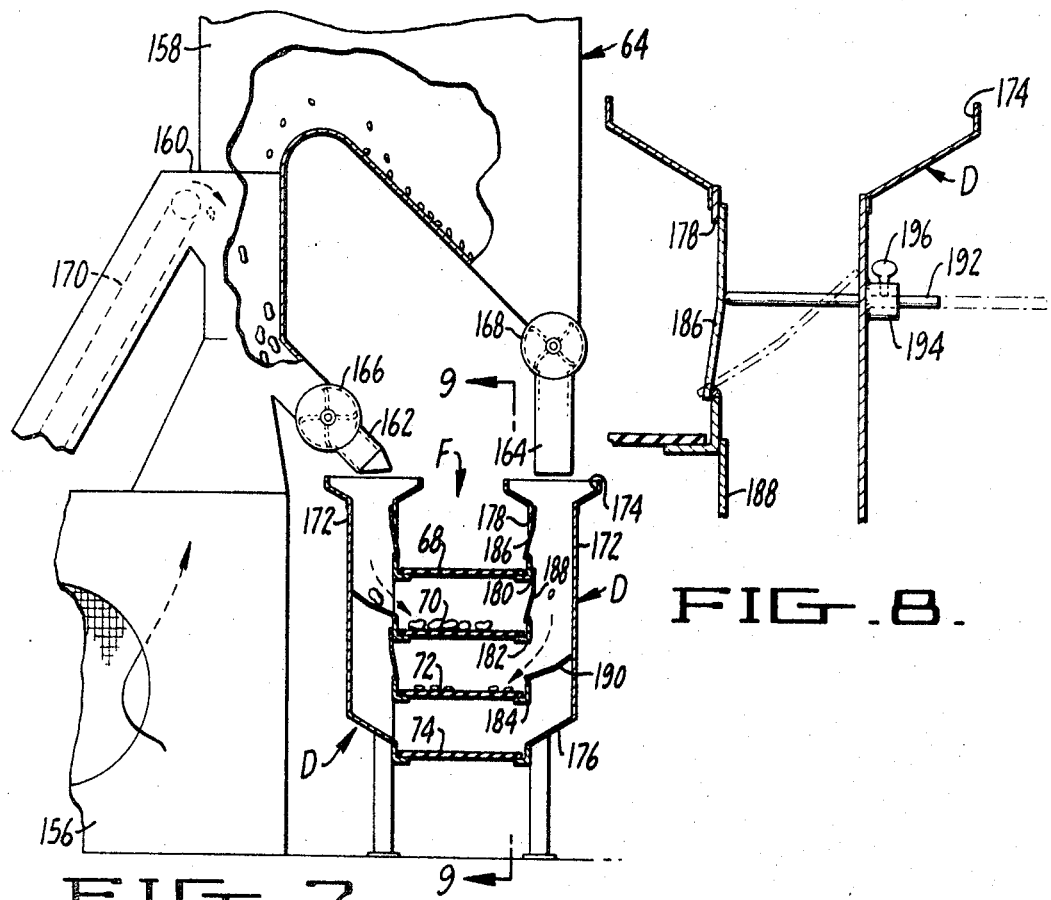
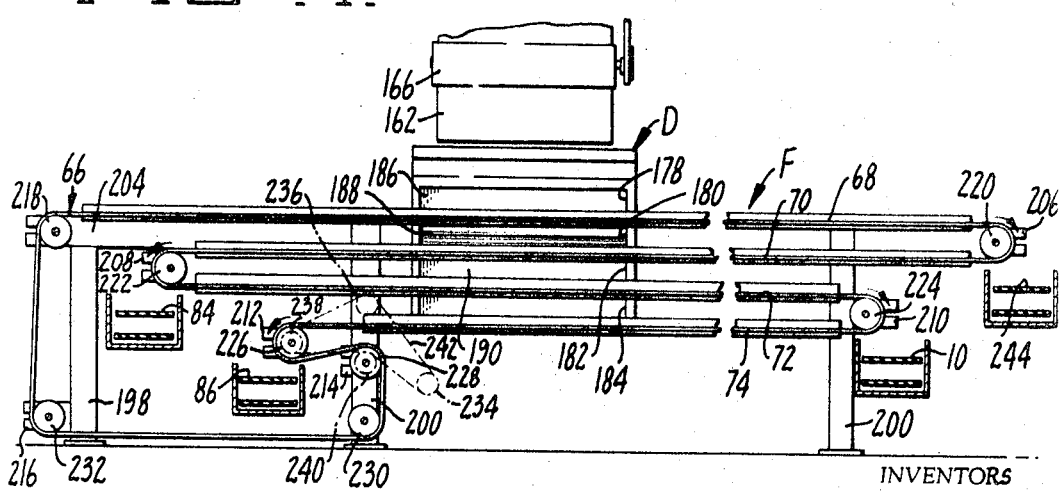

3,469,674
DISTRIBUTION SYSTEM AND COMPONENTS THEREFOR
Bentley B. Mathews, Box 335, Arbuckle, Calif. 95912,
and Paul T. Frentzen, Arbuckle, Calif.; said Frentzen
assignor to said Mathews
Filed Aug. 28, 1967, Ser. No. 663,835
Int. Cl. B65g 47/18, 47/22, 15/22
U.S. Cl. 198—54                          4 Claims

ABSTRACT OF THE DISCLOSURE

A system for collecting separated material from a separating apparatus having a plurality of outputs; selectively directing the material to further processing stations while maintaining it in separated condition; and, finally directing the material to a plurality of final distribution points while maintaining it in separated condition. The system comprises, as its leading component, a collecting tower having a tubular column adapted to simultaneously receive material from all of the outputs of the separating apparatus. The tower is provided with a receiving chamber for each output directed thereinto and alternatively operable baffled discharge outputs adapted to be selectively opened to direct material received in each of the chambers to any one of a number of processing stations. The final directing apparatus of the system comprises a conveyor having a continuous belt arranged in a zig-zag pattern to provide a plurality of reaches, the downstream end of each of which defines a discharge; and a tower for selectively loading material onto any one of the reaches. The tower comprises a tubular column having an inlet for the receipt of material; and an outlet disposed in communication with each of the reaches of the belt. Movable baffles are provided to selectively open any one of the outlets while maintaining the others in closed condition.

---

The present invention relates to a distribution system and, more particularly, is directed to such a system for use in processes where articles are separated according to size and then directed to alternative processing stations.

In the prior art, various types of distribution systems have been provided. These range from the most rudimentary systems to the complicated systems typically employed with mass production assembly lines. Such systems are usually tailored to the specific environment in which they are used and, accordingly, are not well suited for use in other environments. As a result, each time a new environment is developed, a new or modified distribution system must accompany the development.

The environment with which the system of the present invention is designed to be used has resulted, primarily, from the development of our inventions disclosed in the following applications: Ser. No. 481,847, filed Aug. 23, 1965, and entitled Segregation Apparatus and Method, now Patent No. 3,348,680; and Serial No. 573,930, filed Aug. 22, 1966, and entitled Apparatus and Method for Processing Nuts, now Patent No. 3,401,730. The first of these applications relates to a separator having a plurality of outputs for the discharge of material of different sizes. The second of these applications relates to a hulling and shelling apparatus for use in any number of environments, including those where it is used as a processing station downstream of a separator as disclosed in our application Ser. No. 481,847.

In summary, the present invention may be said to reside in several components of a distribution system and the combination thereof. The leading component of the system comprises an apparatus adapted to collect separated material and, selectively, direct it to a number of alternative stations in a separated condition. The downstream components of the system comprise a continuous belt conveyor adapted to simultaneously direct separated material to alternative destinations while maintaining it in a separated state and a loading apparatus for use in combination with the conveyor. The apparatus is designed to selectively direct material onto the conveyor for distribution thereby to any one of its destinations.

It is, accordingly, a principal object of the present invention to provide a distribution system and components therefor capable of moving separated material to various processing stations while maintaining it in a separated state.

Another and more specific object of the invention is to provide such a system and components therefor ideally suited for use in combination with the inventions of our aforementioned applications Ser. Nos. 481,847 and 573,930.

Yet another object of the invention is to provide such a system and components therefor capable of transporting material with a minimum of damage.

Still another object of the invention is to provide such a distribution system and components therefor facilitated for selective adjustment to route separated material to various alternative processing stations, depending upon the condition of the material.

A further object of the invention is to provide such a system and components therefor which is designed to occupy a minimum of space and facilitated for use in multilevel environments.

These and other objects and the specifics of the invention will become more apparent when viewed in light of the accompanying drawings wherein:

FIG. 1 is a perspective view schematically illustrating the distribution system and components of the present invention incorporated into a nut processing plant;

FIG. 2 is a sectional view taken on the plane designated by line 2—2 in FIG. 1;

FIG. 3 is a perspective view, with parts thereof broken away for the sake of illustration, illustrating the collecting tower components of the present invention employed with a separating apparatus of the type disclosed in our aforementioned copending application Ser. No. 481,847;

FIG. 4 is a sectional view taken on the plane designated by line 4—4 in FIG. 3;

FIGS. 5 and 6 are sectional views taken on the planes designated by lines 5—5 and 6—6 in FIG. 4;

FIG. 7 is a transverse elevational view, partially in section, illustrating the conveyor and distribution tower components of the present invention employed in the system of FIG. 1 in combination with a separation device of the air leg type;

FIG. 8 is a transverse elevational view, in section, partially illustrating one of the distribution tower components of the invention and diagrammatically showing the operation thereof; and, FIG. 9 is a longitudinal elevational view, in section, taken on the plane designated by lines 9—9 in FIG. 7.

Referring now specifically to FIG. 1, a first input conveyor is designated therein by the numeral 10. It is onto this conveyor that nuts to be processed are initially charged. Although not illustrated, it is to be understood that this conveyor is preferably of the belt type and runs continuously from one side of the plant to the other. The input conveyor 10 discharges onto a second input conveyor 12 which, in turn, discharges onto a third input conveyor 14. The conveyors 12 and 14 are also, preferably, of the continuous belt type. They may, however, be interrupted. Where the belts are interrupted, it is simply necessary that the successive lengths making up the belts be disposed to feed from one to another.

The conveyor 14 discharges into a shear roll hulling and shelling apparatus 16 of the type disclosed in our application Ser. No. 573,930. From this apparatus, the nut product is conveyed to a classifier 18 by a conveyor 20. The classifier 18 is, basically, a separation apparatus of the type disclosed in our application Ser. No. 481,847. It is designed to separate or "classify" the product from the apparatus 16 on the basis of size. The separated outputs of the classifier 18 above the lowermost output thereof are received in a collecting tower C wherein they are maintained in separated condition and directed, selectively, to any one or more of three further processing stations. The details of the tower C will be developed subsequently with respect to FIGS. 3–6, inclusive. As illustrated, the outputs from the tower C disposed in receiving relationship to the classifier 18 are shown as being directed to air leg separators 22 and 24 and a separator 26 by conveyors 28, 30 and 32, respectively. The separator 26 is also of the type disclosed in our application Ser. No. 481,847. The lowermost output of the classifier 18 is directed to a separator 34, also of the type disclosed in our latter application, by a conveyor 36.

The separators 26 and 34 differ from each other only in the characteristics of the segregating belts employed therein. Specifically, the belts of the separator 26 are selected for the separation of small classified nuts, while the belts of the classifier 34 are selected for the separation of large classified nuts. In both separators, as in the classifier 18, the aperture sizes of the belt increase, progressively, from the uppermost output to the lowermost output. As a result, the uppermost output is of the finest aggregate, while the lowermost output is of the coarsest aggregate.

The coarsest lowermost outputs from the separators 26 and 34 are directed, by conveyors 38 and 40 to cracking rollers 42 disposed on the apparatus 16. These rollers, as can be seen from our application Ser. No. 573,930, are designed to crack the shell of hard to hull nuts. Such nuts are, naturally, the largest product handled by the classifier 18 and the separators 26 and 34 and, accordingly, find their ways to the lowermost outputs of the separators. From the cracking rollers 42, these nuts pass through the apparatus 16 to the conveyor 20. It is here noted that the apparatus 16, preferably, includes an asperator 44 thereabove to remove dust.

The separators 26 and 34 have collecting towers C, corresponding to that used for the classifier 18, disposed in receiving relationship to the outputs thereof above their lowermost outputs. As illustrated in FIG. 1, these towers distribute to conveyors 46, 48 and 50 designed for the receipt of material product of fine, medium and coarse aggregate, respectively. The outputs from the tower C of the separator 26 are directed to the conveyors 46, 48 and 50 conveyors 52, 54 and 56, respectively. The outputs of the tower C for the separator 34 are directed to the conveyors 46, 48 and 50 by conveyors 58, 60 and 62, respectively.

The conveyor 46 discharges to the conveyor 30 which, in turn, discharges to the air leg separator 24. The conveyor 48 discharges to an air leg separator 64 disposed in parallel relationship to the air legs 22 and 24. The conveyor 50 discharges to the upper reach of a final distribution conveyor, designated by the letter F. The conveyor F, as will become more apparent from the detailed description of FIG. 9, incorporates one continuous belt 66 trained around staggered belt directing rollers to define first, second, third and fourth distribution reaches 68, 70, 72 and 74, respectively. The staggered zig-zag interrelationship of these reaches provides a discharge at the downstream end of each reach. The discharges for the reaches 68, 70, 72 and 74 are represented by arrow lines and designated by the numerals 76, 78, 80 and 82, respectively.

The legends on FIG. 1 designate the product which each of the reaches of the conveyor F is designed to carry in the illustrated plant. Specifically, the reaches 68, 70, 72 and 74 are designed to carry hulls, in shell salable nuts, recycle nuts and salable nut meats. FIG. 1 also shows that: the discharge 76 from the reach 68 leads to a hull collection point; the discharge 78 from the reach 70 leads to a nut conveyor 84; the discharge 80 from the reach 72 leads back to the first input conveyor 10; and, the discharge 82 from the reach 74 leads to a conveyor 86. Although not illustrated, it is to be understood that the conveyors 84 and 86 may discharge to any desired final collection points.

Although not illustrated in FIG. 1, it is to be understood that the air leg separators 22, 24 and 64 discharge onto select reaches of the conveyor F through means of distribution towers D. The detailed construction and operation of these towers will be developed subsequently with respect to FIGS. 7 and 8. As seen in FIG. 1, the light and heavy outputs of the separators 22, 24 and 64, are distributed onto the reaches of the conveyor F as follows:

| Separator | Heavy output reach | Light output reach |
|---|---|---|
| 24 | 70 | 72 |
| 22 | 74 | 72 |
| 64 | 70 | 72 |

FIG. 1 also illustrates a reclamation circuit which may be used in the plant to intercept product on the reach 72 and additionally process this product, rather than recirculate it to the input conveyor 10. This circuit comprises: a deflector 88 disposed over the reach 72 to intercept product thereon; a conveyor 90 disposed in receiving relationship to the deflector 88; a cracker and separator 92 disposed in receiving relationship to the conveyor 90; a conveyor 94 leading from the upper output of the cracker and separator 92 to the reach 68; a conveyor 96 leading from the lower output of the cracker and separator 92; and, an air leg separator 98 disposed in receiving relationship to the conveyor 96. Although not illustrated, it is to be understood that the separator 98 is provided with a distribution tower D to direct the output therefrom to the conveyor F. As shown, this distribution tower directs the heavy output to the reach 74 and the light output to the reach 68.

The cracker and separator 92 comprises a pair of shear rolls 100, similar to those employed in the apparatus of our application Ser. No. 573,930, disposed in receiving relationship to the conveyor 90 and in discharging relationship to a separator 102 disposed therebelow. The separator 102 comprises a single belt apparatus similar to a single stage of the apparatus disclosed in our application Ser. No. 481,847.

FIG. 2 shows that the plant of FIG. 1 is a two-deck arrangement. In this arrangement, the separator 34 is mounted in stacked relationship on the hulling and shelling apparatus 16. Although not illustrated, it is to be understood that the separator 26 is also supported at an elevation corresponding to that of the separator 34. The classifier 18 is also elevated and the final distribution conveyor F is disposed beneath and to one side thereof. This overall arrangement wherein the separators and the classifier are elevated facilitates running of the conveyors 46, 48 and 50 at a level therebelow. The conveyors 20 and 36 run in an upwardly inclined disposition.

From FIG. 2, it can also be seen that the downwardly inclined output conveyors discharging from the collecting tower C comprise tubular gravity feed ducts. This construction may be seen from the conveyors 58, 60 and 62 leading from the tower C on the separator 34. While the character of all the conveyors in the plant of FIG. 1 has not been specifically described, it is to be understood that all horizontal and upwardly inclined conveyors are, preferably, of the continuous belt type. Furthermore, although not limited to this use, it is noted that the plant of FIG. 1 is designed for the separation and hulling of almonds. Naturally, the components of this plant and the distribution system incorporated thereinto might be employed for other commodities.

COLLECTING TOWER

The collecting tower C may best be seen from FIGS. 3–6, inclusive. In these figures, the tower is shown disposed in receiving relationship to the trays of a separator of the type disclosed in our copending application Ser. No. 481,847. The trays are designated by the numerals 104, 106, 108 and 110 and, as can be seen from FIG. 3, are disposed in vertically spaced relationship. Each of the trays includes an outlet spout, designated by the letter S, at its lower extremity.

The collecting tower C comprises, as its basic element, a primary tubular column 112. The column 112 is of rectangular cross-section and made up of angled corner pieces 114 rigidly interconnected by a plurality of vertically spaced rearward side walls 116; a plurality of vertically spaced first lateral side walls 118; a plurality of vertically spaced second lateral side walls 120; and a plurality of vertically spaced forward side walls 122. These walls are all fixedly connected to the corner pieces between which they extend. The rearward side walls 116 define inlet openings 124 therebetween for slidable receipt of the spouts S. The side walls 118, 120 and 122 define therebetween, respectively, a first row of outlet openings 126, a second row of outlet openings 128 and a third row of outlet openings 130. The outlet openings 126, 128 and 130 are disposed so that a composite set comprised of one opening in each of the rows thereof is provided beneath each of the inlet openings 124. As can be seen from FIG. 3, each set comprises a pair of transversely aligned openings 126 and 128 disposed beneath the level of the inlet opening 124 thereabove and an opening 130 disposed beneath the level of the openings 126 and 128 thereof.

Gate structure is mounted within the column 112 to provide mutually isolated receiving chambers in communication with each of the inlet openings 124. These chambers are disposed to receive material discharged thereinto through the inlet openings 124 and to direct this material, selectively, through any of the outlet openings in the composite set provided for the inlet opening discharging thereinto. The gate structure comprises, for each of the inlet openings and the composite set of outlet openings provided therefor: a first panel 132 fixed to the corner pieces 114 and extending completely across the column 112 in downwardly inclined relationship beneath the opening 130; a second panel 134 hingedly secured immediately beneath the outlet opening 126 by hinged connection to the corner pieces 114 to either side thereof; and, a third panel 136 hingedly secured beneath the outlet opening 128 by pivotal connection to the corner pieces 114 to either side thereof. The panels 134 and 136, as can be best seen from FIG. 5, are disposed for pivotal movement between a first position extending over and closing the opening thereabove and a second position extending across the column 112. The panels 134 and 136 in each composite set are disposed so that they may be moved to the latter position only in one-at-a-time fashion. This results because movement of one of the panels to the second position functions to lock the opposite panel in the first position.

Movement of the panels 134 and 136 between the first and second positions is provided by hinge pins 138 and 140, respectively, fixed thereto and extending therefrom to operating levers 142 and 144, respectively. The levers 142 and 144 are disposed laterally of the column 112 for ready access. Counterbalance weights 146 and 148 are secured, respectively, to the distal ends of the levers 142 and 144. Upon movement of the levers to a condition swinging the panel secured thereto to the first position, these weights function to retain the panels in position under the influence of gravity.

The basic structure of the collecting tower C is completed by secondary tubular columns 150, 152 and 154. These columns, as can be seen from FIG. 4, are of channel shaped cross-section and secured to the corner pieces 114 in receiving relationship to the rows of openings 126, 128 and 130, respectively. Although not illustrated, it is to be understood that these columns are open at their lower ends for discharge to any desired disposal.

In operation, the composite set of outlet openings provided beneath each of the inlet openings 124 and the gate structure associated therewith provides for the selective discharge of material received through the inlet opening to any one of the columns 150, 152 and 154. To discharge into the column 150, it is simply necessary to move the panel 136 to the first position and the panel 134 to the second position. In the latter condition, the panel 134 functions to intercept material and direct it through the opening 126. Discharge to the column 152 may be similarly effected by moving the panel 134 to the first position and the panel 136 to the second position. In the latter condition, as can be seen from the lower part of FIG. 5, the panel 136 functions to intercept material and direct it through the opening 128. To discharge into the column 154, it is simply necessary to move both of the panels 134 and 136 to the first position. In this condition, the openings 126 and 128 are closed and the panel 132 intercepts material and directs it through the opening 130.

DISTRIBUTION TOWER

FIGS. 7 and 8 show the distribution towers D used in the plant of FIG. 1. As seen in FIG. 7, the view could represent a transverse section taken through the air leg separator 64 and the final distribution conveyor F. The air leg separator of FIG. 7, designated by the numeral 64, is of conventional nature and comprises: a blower 156; a tower 158 having a material inlet 160, a heavy material outlet 162, a light material outlet 164 and an upper air outlet (not illustrated); an air lock 166 interposed in the outlet 162; and, an air lock 168 interposed in the outlet 164. The blower 156 forces air into the tower 158 through the section thereof communicating with the material inlet 160 and material is directed to the inlet 160 by a conveyor 170.

The distribution towers D are identical in construction. Each tower comprises, as its basic element, a tubular column 172 having a funnel-shaped inlet opening 174 at its upper end and a plurality of outlet openings in one of its side walls. In the preferred embodiment, the column is also provided with a lower wall 176 disposed beneath the lowermost outlet opening. The outlet, openings, designated by the numerals 178, 180, 182 and 184 are disposed in vertically spaced relationship to, in the embodiment illustrated, discharge onto the reaches 68, 70, 72 and 74, respectively.

Gate structure mounted within the column 172 of each of the distribution towers provides for the selective discharge of material through but one of the outlet openings thereof at a time. This structure comprises closure panels associated with each of the outlet openings above the lowermost outlet opening 184 and an operating mechanism to facilitate movement and retention of the panels. The panels, designated by the numerals 186, 188 and 190, are hingedly mounted, respectively, beneath the outlet openings 178, 180 and 182, for individual movement between a first position extending over the opening thereabove and a second position extending across the column 172. The operating mechanism for each of the panels comprises: a rod 192 extending slidably through the wall of the column 172 opposite the panel; a sleeve 194 slidably received around the rod and fixed to the wall; and, a set screw 196 threadably received in the sleeve for selective locking engagement with the rod. The operation of this mechanism and the panel associated therewith is diagrammatically illustrated by the solid and phantom line representations in FIG. 8. From this illustration, it can be seen that when the rod 192 is moved to and locked in the solid line position, the panel associated therewith is similarly locked. Upon movement of the rod 192 to the phantom line position illustrated in FIG. 8, the panel associated therewith is permitted to fall to the phantom line position under the influence of gravity. In the latter position, heretofore referred to as the second position, the panel directs material flow to the outlet opening immediately thereabove and prevents material flow therepast through the column 172.

While only one of the operating mechanisms is illustrated in detail, it is to be understood that each of the panels 186, 188 and 190 is provided with a similar mechanism. As a result, any one of the panels may be individually moved to and retained in either the first or second position. The uppermost panel moved to the second position, however, controls flow through the distribution tower. This results because the uppermost panel in the second position deflects all material through the outlet opening disposed immediately thereabove. When all of the panels in a distribution tower are moved to and retained in the first position, material received in the tower is directed through the lowermost outlet opening 184.

By providing a distribution tower D for each outlet source directed to the final distribution conveyor F, the material from each source may be selectively directed to any reach of the conveyor. This selective routing of material may be effected by simple adjustment of the distribution towers. No major equipment modification or movement is required.

FINAL DISTRIBUTION CONVEYOR

The conveyor F, as heretofore noted, employs a single continuous belt 66 supported in a zig-zag pattern to define a plurality of reaches. The support structure for the belt can best be seen from FIG. 9. It comprises, as its basic element, a framework having vertically disposed supporting legs 198, 200 and 202 and horizontally disposed support members 204, 206, 208, 210, 212, 214 and 216 mounted on the legs. The members 204 and 206 rotatably support first and second belt guiding rollers 218 and 220, respectively. These rollers are disposed in horizontally spaced parallel relationship and support the reach 68 in a substantially horizontal plane on their upper surfaces. A third belt guiding roller 222 is supported on the members 208 in horizontally spaced parallel relationship to the roller 220. The upper surface of the roller 222, together with the lower surface of the roller 220, supports the reach 70 in a plane disposed beneath that of the reach 68. A fourth belt guiding roller 224 is disposed in horizontally spaced parallel relationship to the roller 222 on the members 210. The upper surface of this roller, together with the lower surface of the roller 222 supports the reach 72 in a plane disposed beneath the reach 70. A fifth belt guiding roller 226 is mounted on the members 212 in horizontally spaced parallel relationship to the roller 224. The upper surface of the roller 226, together with the lower surface of the roller 224, supports the reach 74 in a plane disposed beneath that defined by the reach 72.

Belt guiding rollers are disposed between the fifth roller 226 and the first roller 218 to direct the belt therebetween. These comprise a sixth roller 228 mounted on the members 212; a seventh roller 230 mounted on the legs 200; and, an eighth roller 232 mounted on the members 216. All of the latter rollers are mounted in parallel relationship to the first to sixth rollers and disposed beneath the reach 74.

Tension adjustment of the belt 66 is provided by adjustable mountings between each of the support members 204–216 and the roller mounted thereon. The drive for the belt 66 is provided by the phantom line arrangement shown in FIG. 9. This comprises: a motor driven sprocket 234; an idler sprocket 236; a drive sprocket 238 keyed to the roller 226; a drive sprocket 240 keyed to the roller 228; and, a continuous chain 242 trained around the sprockets.

The arrow lines in FIG. 9 represent the discharging of material from the various reaches of the belt 66. The conveyors 10, 84 and 86 beneath the discharge ends of the reaches 72, 70 and 74, respectively, are the same as those schematically illustrated in FIG. 1. In addition to these receiving conveyors, a conveyor 244 is shown in FIG. 9 in receiving relationship to the discharge end of the reach 68.

In operation, the conveyor F simultaneously directs material received on the respective reaches thereof to the alternative destinations indicated. This operation is effected with a single continuous belt without any comingling of the material received on the respective reaches of the belt. The stacked zig-zag pattern of the reaches also has the advantage of being very compact and well suited for use with distribution components arranged in a "parallel battery format." Such a format is exemplified by the air leg separators shown in FIG. 1.

From the foregoing detailed description and accompanying drawings, it is believed apparent that the present invention enables the attainment of the objects initially set forth herein.

What is claimed is:

1. A conveyor for use in simultaneously conveying a plurality of products to different destinations while maintaining said products in mutually isolated relationship, said conveyor comprising:
   (A) first and second horizontally spaced substantially parallel belt directing rollers, said rollers being disposed with the upper surfaces thereof in substantially coplanar relationship and defining, respectively, the leading and trailing support rollers for the upper reach of a continuous belt;
   (B) a third belt directing roller horizontally spaced from said second roller in a direction measured towards said first roller and disposed in substantially parallel relationship to said second roller with the upper surface thereof disposed below the plane defined by the upper surfaces of said first and second rollers;
   (C) belt directing means disposed beneath said third roller, said means being adapted to direct a continuous belt from said third roller to said first roller;
   (D) a continuous conveyor belt directed from said first roller to said second roller, from said second roller to said third roller, and from said third roller to said means and back to said first roller to define:
      (1) a reach between said first and second rollers discharging over second roller;
      (2) a reach between said second and third rollers discharging over said third roller; and,
      (3) a connecting length between said third roller and said first roller;
   (E) drive means to continuously move said belt around said rollers and said belt directing means.

2. A conveyor according to claim 1, wherein:
   (A) said belt directing means comprises:
      (1) a fourth belt directing roller horizontally spaced from said third roller in a direction measured towards said second roller and disposed in substantially parallel relationship to said third roller with the upper surface thereof disposed below the plane defined by the lower surface of said second roller and the upper surface of said third roller;

(2) a fifth belt directing roller horizontally spaced from said fourth roller in a direction measured towards said third roller and disposed in substantially parallel relationship to said fourth roller with the upper surface thereof disposed below the plane defined by the lower surface of said third roller and the upper surface of said fourth roller; and (3) belt guiding means operatively associated with said fifth and first rollers, said means being adapted to guide a continuous belt from said fifth roller to said first roller;

(B) said continuous conveyor belt is directed from said third roller to said fourth roller, from said fourth roller to said fifth roller and from said fifth roller to said guiding means and back to said first roller to define:

(1) a reach between said third and fourth rollers discharging over said fourth roller;

(2) a reach between said fourth and fifth rollers discharging over said fifth roller; and (3) a connecting length between said fifth roller and said first roller.

3. A distribution system comprising:
(A) a conveyor comprising:
(1) a continuous belt threaded around a plurality of spaced directing rollers in a zig-zag pattern to define a plurality of substantially horizontally disposed vertically spaced reaches, the downstream end of each of which defines a discharge therefor; and, (2) drive means to continuously move said belt around said rollers;

(B) a tower for directing the output of a source of material to any one of said reaches, said tower comprising:

(1) a tubular column extending alongside of said conveyor, said column having:
(a) an inlet aperture in the upper portion thereof to provide for the charging of material thereinto;
(b) a primary outlet aperture in the lower portion thereof communicating with the lowermost reach of said belt to provide for the discharge of material from said column to said lowermost reach; and,
(c) at least one secondary outlet aperture communicating with each reach of said belt above the lowermost reach thereof to provide for the discharge of material from said column to the reaches of said belt above the lowermost thereof;

(2) a panel hingedly secured to said column beneath each of said secondary outlet apertures for swinging movement within said column between a first position covering the secondary outlet aperture thereabove and permitting the flow of material therepast through said column and a second position extending across said column to interrupt the flow of material therethrough and direct said flow through the secondary outlet aperture thereabove; and, (3) means to selectively move each of said panels between said positions and effect the retention threof in either of said positions.

4. A system for use in distributing output material from a plurality of vertically spaced discharge spouts to selectively variable horizontally spaced destination points, said system comprising:

(A) a collection tower for receiving material from said spouts comprising:
(1) a tubular column having:
(a) inlet means in communication with each of said spouts for the receipt of material therefrom;
(b) a plurality of outlet means communicating with each of said inlet means for the discharge of material from said column, the outlet means communicating with said respective inlet means being mutually isolated from each other to prevent the flow of material therebetween through said column;

(2) gate means operatively associated with each of said inlet means and the outlet means communicating therewith to selectively open one of the outlet means communicating with each of said inlet means while closing the other outlet means communicating therewith; and, (3) a plurality of mutually isolated receiving means communicating with said outlet means to receive material discharged therethrough, each of said receiving means being in common communication with at least one outlet means communicating with each of said inlet means;

(B) conveyor means communicating, respectively, with each of the receiving means of said collection tower to receive and transport material therefrom;

(C) a conveyor comprising:
(1) a continuous belt threaded around a plurality of spaced directing rollers in a zig-zag pattern to define a plurality of substantially horizontally disposed vertically spaced reaches, the downstream end of each of which defines a discharge therefor; and, (2) drive means to continuously move said belt around said rollers;

(D) distribution towers communicating, respectively, with each of said conveyor means to receive material therefrom and, selectively, dispense the material received thereby on any one of the reaches of said belt, each of said distribution towers comprising:

(1) a tubular column extending alongside of said conveyor, said column having:
(a) an inlet aperture in the upper portion thereof disposed in receiving communication with the conveyor means communicating with said distribution tower;
(b) a primary outlet aperture in the lower portion thereof communicating with the lowermost reach of said belt to provide for the discharge of material from said column to said lowermost reach; and,
(c) at least one secondary outlet aperture communicating with each reach of said belt above the lowermost reach thereof to provide for the discharge of material from said column to the reaches of said belt above the lowermost thereof;

(2) a panel hingedly secured to said column beneath each of said secondary outlet apertures for swinging movement within said column between a first position covering the secondary outlet aperture thereabove and permitting the flow of material therepast through said column and a second position extending across said column to interrupt the flow of material therethrough and direct said flow through the secondary outlet aperture thereabove; and, (3) means to selectively move each of said panels between said positions and effect the retention thereof in either of said positions.

References Cited

UNITED STATES PATENTS 2,029,205  1/1936  Sumner ........... 193—29 X
2,750,021  6/1956  Patterson ........... 193—29

FOREIGN PATENTS 983,316  2/1965  Great Britain.

EDWARD A. SROKA, Primary Examiner

U.S. Cl. X.R.

198—159